(12) United States Patent
Chan (10) Patent No.: US 8,738,622 B2
(45) Date of Patent: May 27, 2014

(54) PROCESSING CAPTURED IMAGES HAVING GEOLOCATIONS

(75) Inventor: Sammy Chan, East Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 12/958,082

(22) Filed: Dec. 1, 2010

(65) Prior Publication Data

US 2011/0129120 A1    Jun. 2, 2011

(30) Foreign Application Priority Data

Dec. 2, 2009 (AU) .................................. 2009243486

(51) Int. Cl.
*G06F 7/00*    (2006.01)
*G06F 17/30*    (2006.01)

(52) U.S. Cl.
USPC .......................................... 707/737; 707/915

(58) Field of Classification Search
USPC .................. 707/705, 736, 737, 781, 913, 915
See application file for complete search history.

(56) References Cited

U.S. PATENT DOCUMENTS

| | | | |
|---|---|---|---|
| 2003/0014491 A1* | 1/2003 | Horvitz et al. | 709/206 |
| 2004/0181679 A1* | 9/2004 | Dettinger et al. | 713/193 |
| 2006/0253491 A1* | 11/2006 | Gokturk et al. | 707/104.1 |
| 2009/0077129 A1* | 3/2009 | Blose | 707/104.1 |
| 2009/0327229 A1* | 12/2009 | O'Connor et al. | 707/3 |
| 2010/0165076 A1* | 7/2010 | Vau | 348/36 |

OTHER PUBLICATIONS

Examination Report, which issued on Jan. 10, 2012, in counterpart Australian application No. 2009243486.
Barnes, R., et al., "GEOPRIV—An Architecture for Location and Location Privacy in Internet Applications", Internet Engineering Task Force (IETF), Jul. 9, 2009, pp. 1-42.

* cited by examiner

*Primary Examiner* — Marc Somers
(74) *Attorney, Agent, or Firm* — Fitzpatrick, Cella, Harper & Scinto (57) ABSTRACT

Methods (105), apparatuses (600), and computer readable storage mediums for processing captured images having geolocations related to the captured images at the time of capture are disclosed. A representative geolocation is associated (110) with each group of images previously captured at the same location. For each representative geolocation, based on at least the timestamp of the images associated with the representative geolocation, the probability is determined (120) that a further image will be captured at or near the representative geolocation. For representative geolocations with a determined probability above a predetermined threshold, the respective representative geolocation is associated (130) with at least one personal place.

27 Claims, 7 Drawing Sheets

PROCESSING CAPTURED IMAGES HAVING GEOLOCATIONS

REFERENCE TO RELATED PATENT APPLICATION

This application claims the benefit under 35 U.S.C. §119 of the earlier filing date of Australian Patent Application No 2009243486, filed 2 Dec. 2009, hereby incorporated by reference in its entirety as if fully set forth herein.

TECHNICAL FIELD

The present invention relates to image selection and in particular to the use of metadata associated with photographs.

BACKGROUND

Using the Internet as a medium for sharing photos is becoming widely popular due to the immediacy and extensive reach to audiences. The methods of sharing such photos are increasingly more sophisticated, ranging from sending email messages with photos attached to specific recipients to uploading photos to photo sharing and social networking sites. Consequently, photos can be shared to varying extents, ranging from a single trusted recipient to virtually everyone with access to the Internet, including strangers who may have other agendas besides appreciating the photos.

Depending on the content of the photos, public sharing of photos may be a privacy concern to a user, because the photos may show, for example, the inside of a private residence and possibly children playing. Technological advances that enable capturing of information related a photo and storing such information in the corresponding metadata heightens such concerns. For example, the geolocation of where a photo is captured can be stored in the metadata by a device equipped with a built-in GPS receiver, allowing the subject matter of the photo to be associated with the location at which the subject matter was captured. In addition, a device with a face-recognition function enables automatic tagging of faces appearing in a photo with corresponding names and stores the tags in the metadata.

Photo sharing service providers are attempting to address the above-mentioned concerns by offering various security measures as part of the sharing process. Depending on the photo sharing site, the security measures may range from providing a global setting for enabling or disabling the sharing of geotags (geolocation tags) for the entire photo collection of a user, to providing a per photo setting for sharing a geotag with selected groups of people, e.g. friends, family, everyone, etc. Even though users have a mechanism to control the sharing of geotags of their photos, the actual task can be laborious and tedious due to the ever-increasing size of their photo collections. To share the geotags of a user's photo collection fully, the user is required to inspect the user's photo collection and make an appropriate setting for each photo accordingly. The time-consuming and potentially error-prone nature of this process would deter users from sharing the geotags of their photo collection as much as possible, leaving the geotags of many photos unshared even without the risk of any privacy concern. Often, the process causes inadvertent sharing of geotags of private places for many users. The practice of photo sharing service providers of making public sharing of geotags a default option exacerbates this situation. This causes users to opt in the scheme without necessarily considering the implications.

Users are in need of a more effective method that enables the users to control the sharing of geotags and other metadata of their photos individually, without requiring the users to inspect the photos to make a determination.

SUMMARY

In accordance with an aspect of the invention, there is provided a method of processing captured images having geolocations related to the captured images at the time of capture. A representative geolocation is associated with each group of images previously captured at the same location. For each representative geolocation, based on at least the timestamp of the images associated with the representative geolocation, the probability is determined that a further image will be captured at or near the representative geolocation. For representative geolocations with a determined probability above a predetermined threshold, the respective representative geolocation is associated with at least one personal place.

The method may further comprise the step of capturing an image having a geolocation related to the captured image at the time of capture.

The method may further comprise the step of suppressing at least one metadata value of a captured image if the geolocation related to the captured image is at or near at least one personal place. The at least one metadata value may be suppressed by at least one of storing the metadata value in an external data store separately from the captured image and encrypting the metadata value.

The method may further comprise the step of specifying a geolocation as a personal location. Specifying the geolocation of a personal location may comprise inputting textual addresses, or importing addresses from a contact list, or manually entering the geolocation.

The captured image may be captured using an image capturing apparatus adapted to acquire a geolocation related to the captured image at the time of image capture.

The geolocations and at least the timestamps of the images may be stored for further processing, the images being downloaded separately.

In accordance with another aspect of the invention, there is provided an apparatus for processing captured images having geolocations related to the captured images at the time of capture. The apparatus comprises: a memory for storing data and a computer program; and a processor unit coupled to the memory for executing a computer program, the memory and the processor configured to process the captured images. The computer program comprises: a computer program code module for associating a representative geolocation with each group of images previously captured at the same location; a computer program code for each representative geolocation, determining, based on at least the timestamp of the images associated with the representative geolocation, the probability that a further image will be captured at or near the representative geolocation; and a computer program code module for representative geolocations with a determined probability above a predetermined threshold, associating the respective representative geolocation with at least one personal place.

The apparatus may further comprise a computer program code module for suppressing at least one metadata value of a captured image if the geolocation related to the captured image is at or near at least one personal place. The at least one metadata value may suppressed by at least one of storing the metadata value in an external data store separately from the captured image and encrypting the metadata value.

The apparatus may further comprise an image capturing apparatus adapted to acquire a geolocation related to a captured image at the time of image capture.

The geolocations and at least the timestamps of the images may be stored in the memory of the apparatus for further processing, allowing the images to be downloaded from the apparatus and removed from the memory.

In accordance with yet another aspect of the invention, there is provided a computer readable storage medium having recorded therein a computer program for processing captured images having geolocations related to the captured images at the time of capture for execution by a processing unit. The computer program comprises: a computer program code module for associating a representative geolocation with each group of images previously captured at the same location; a computer program code module for each representative geolocation, determining, based on at least the timestamp of the images associated with the representative geolocation, the probability that a further image will be captured at or near the representative geolocation; and a computer program code module for representative geolocations with a determined probability above a predetermined threshold, associating the respective representative geolocation with at least one personal place.

The computer readable storage medium may further comprise a computer program code module for suppressing at least one metadata value of a captured image if the geolocation related to the captured image is at or near at least one personal place.

The at least one metadata value may be suppressed by at least one of storing the metadata value in an external data store separately from the captured image and encrypting the metadata value.

The images may be captured using an image capturing apparatus adapted to acquire a geolocation related to a captured image at the time of image capture.

The geolocations and at least the timestamps of the images may be stored for further processing, allowing the images to be downloaded.

BRIEF DESCRIPTION OF THE DRAWINGS

Embodiments of the invention are described hereinafter with reference to the following drawings, in which.

DETAILED DESCRIPTION

Methods, apparatuses, and computer program products for processing captured images having geolocations related to the captured images at the time of capture are disclosed. In the following description, numerous specific details, including particular types of metadata, prediction intervals, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

[Introduction]

The embodiments of the invention are aimed at enabling users to share their photo collections, including associated metadata, as fully as possible without the unacceptable risk of revealing privacy or sensitive personal information. Obvious privacy concerns include the public disclosure of geotags (the geolocation of where a photo was taken by a device equipped with, for example, a built-in GPS receiver) of photos taken at a private residence or school, etc. The captured image may be captured using an image capturing apparatus adapted to acquire a geolocation related to the captured image at the time of image capture. Other less obvious but still important privacy concerns include the public disclosure of geotags of places that are general public, but may be considered as personal by a user due to frequent and predictable visits, e.g. local parks, sports grounds, and the like. Thus, in general, a user may consider places such as local parks, entertainment venues, schools, sports grounds, and the like as "personal" locations. A user's home may be even more personal and be deemed a "private" location.

The general approach of the embodiments of the invention involves determining and selecting a subset of images (e.g., photos) from a photo collection that may constitute a privacy concern for a user if certain associated metadata is shared with a corresponding image. In the following description, for ease of description only, the term "photo" will be used rather than the term "image", however, it will apparent to those skilled in the art in the light of this disclosure that the invention is not limited simply to photos. Several embodiments are described hereinafter for selecting the subset of photos and suppressing the metadata of the photos, so that the risk of revealing privacy information is mitigated. The embodiments of the invention are able to process and suppress metadata of sensitive images on a per image (or photo) basis based on geolocation. This is in marked contrast to suppressing metadata of an image dependent upon the recipient. Further, this method is able to selectively suppress what metadata is suppressed.

[Image Capture System]

Figure 6A:
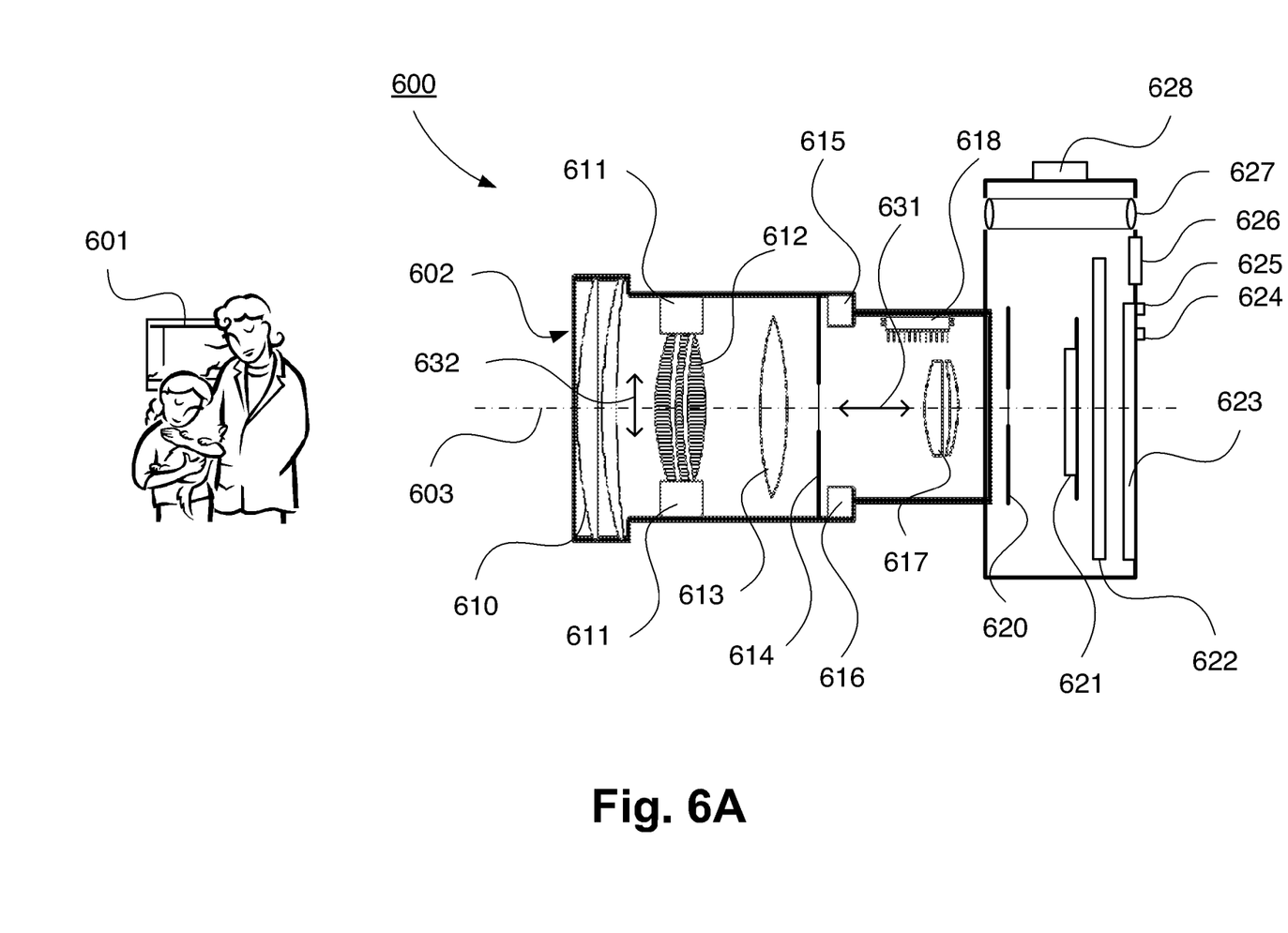
FIG. 6A is a cross-section diagram of a camera system on which the embodiments of the invention may be practised.
Figure 6B:
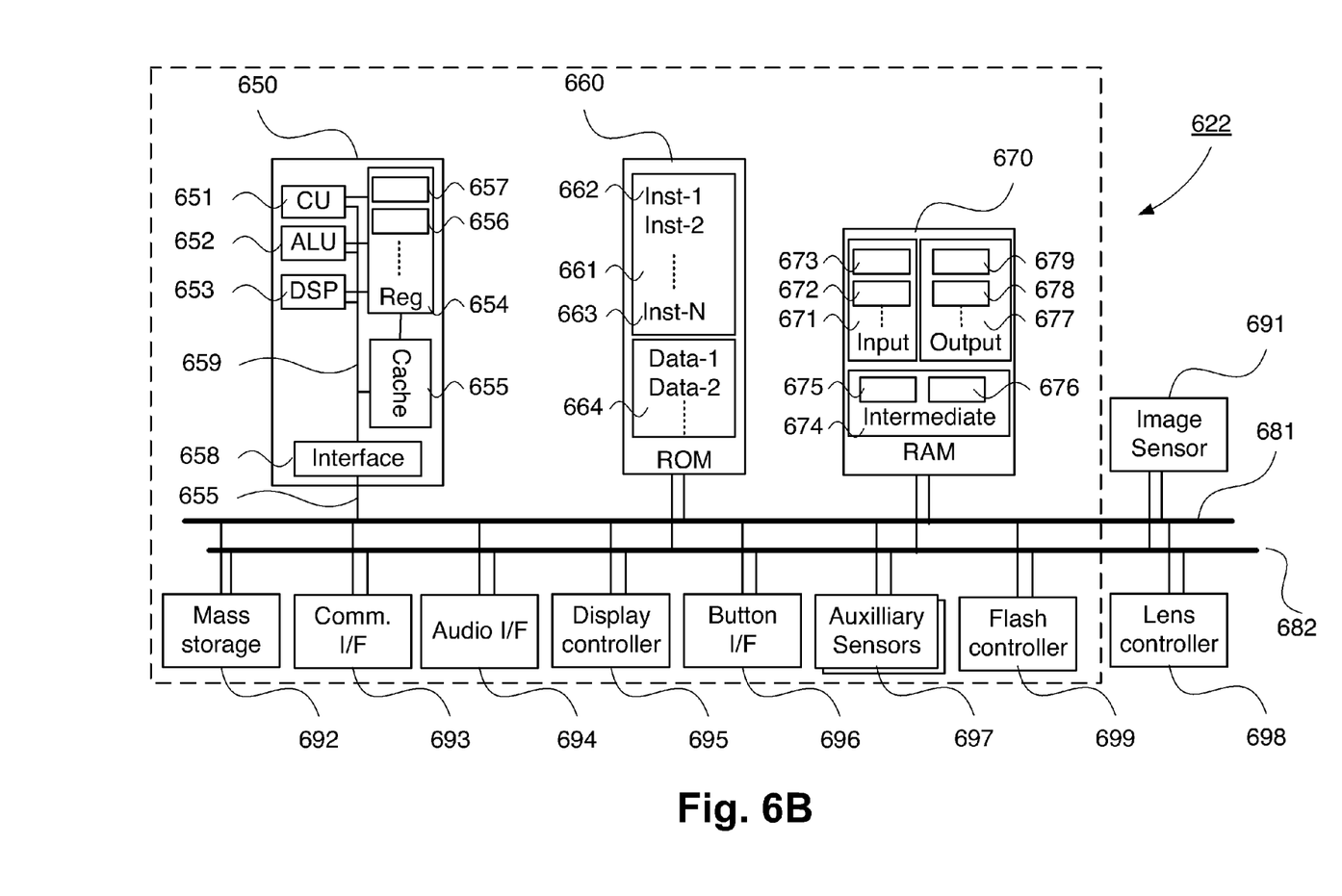
FIG. 6B is a schematic block diagram of an image capture system on which the embodiments of the invention may be practised.

Preferably, the method is implemented in an image capturing apparatus as shown in FIGS. 6A and 6B. FIG. 6A is a cross-section diagram of an exemplary image capturing apparatus 600, upon which the various arrangements described can be practiced. In the general case, the image capture system 600 is a digital still camera or a digital video camera (also referred to as a camcorder).

As seen in FIG. 6A, the camera system 600 comprises an optical system 602, which receives light from a scene 601 and forms an image on a sensor 621. The sensor 621 comprises a 2D array of pixel sensors that measure the intensity of the image formed on the array of pixel sensors by the optical system 602 as a function of position. The operation of the camera 600, including user interaction and all aspects of reading, processing and storing image data from the sensor 621 is coordinated by a main controller 622, which comprises a special-purpose computer system. This system is considered in detail hereinafter with reference to FIG. 6B.

The user can communicate with the controller 622 via a set of buttons including a shutter release button 628, used to initiate focus and capture of image data, and other general and special purpose buttons 624, 625, 626, which may provide direct control over specific camera functions such as a flash operation or support interaction with a graphical user interface presented on a display device 623 (e.g., an LCD panel). The display device 623 may also have a touch screen capability to further facilitate user interaction. Using the buttons 624, 625, 626 and controls, the behaviour of the camera 600 can be controlled or modified. Typically, capture settings such as the priority of shutter speed or aperture size when achieving a required exposure level, the area used for light metering, use of flash, ISO speed, options for automatic focusing and many other photographic control functions can be controlled. Further, processing options such as the colour balance or compression quality can be controlled. The display device 623 is typically also used to review the captured image or video data. Commonly, a still image camera uses the display device 623 to provide a live preview of the scene, thereby providing an alternative to an optical viewfinder 627 for composing prior to still image capture and during video capture.

The optical system 602 comprises an arrangement of lens groups 610, 612, 613 and 617, which can be moved relative to each other along a line 631 parallel to an optical axis 603 under control of a lens controller 618. Such movement of the lens group elements 610, 612, 613 and 617 can achieve a range of magnification levels and focus distances for the image formed at the sensor 621. The lens controller 618 may also control a mechanism 611 to vary the position, on any line 632 in the plane perpendicular to the optical axis 603, of a corrective lens group 612, in response to input from one or more motion sensors 615, 616 or the controller 622, so as to shift the position of the image formed by the optical system 602 on the sensor 621. Typically, the corrective optical element 612 is used to effect an optical image stabilisation by correcting the image position on the sensor 621 for small movements of the camera 600, such as those caused by handshake. The optical system 602 may further comprise an adjustable aperture 614 and a shutter mechanism 620 for restricting the passage of light through the optical system 602. Although both the aperture 614 and shutter 620 are typically implemented as mechanical devices, the aperture 614 and shutter 620 may also be constructed using materials, such as liquid crystal, whose optical properties can be modified under the control of an electrical control signal. Such electro-optical devices have the advantage of allowing both shape and the opacity of the aperture 614 to be varied continuously under control of the controller 622.

FIG. 6B is a schematic block diagram of the main controller 622 of FIG. 6A, in which other components of the camera 600 that communicate with the controller 622 are depicted as functional blocks. In particular, an image sensor 691 and a lens controller 698 are depicted without reference to their physical organisation or the image forming process. The image sensor 691 and the lens controller 698 are treated as devices that perform specific pre-defined tasks and to which data and control signals can be passed. FIG. 6B also depicts a flash controller 699, which is responsible for operation of a strobe light that can be used during image capture in low light conditions as auxiliary sensors 697, which may form part of the camera system 600. Auxiliary sensors 697 may include:

orientation sensors that detect if the camera is in a landscape or a portrait orientation during image capture;
motion sensors that detect movement of the camera;
a GPS receiver that obtains a current geolocation to provide a geotag;
other sensors that detect the colour of the ambient illumination or assist with autofocus and so on.

Although these are depicted as part of the controller 622, the auxiliary sensors 697 may be implemented as separate components within the camera system 600.

The controller 622 comprises a processing unit 650 for executing program code, Read Only Memory (ROM) 660 and Random Access Memory (RAM) 670, as well as non-volatile mass data storage 692. In addition, at least one communications interface 693 is provided for communication with other electronic devices and network services such as printers, displays, general purpose computers and the Internet. Examples of communication interfaces include USB, IEEE1394, HDMI, Ethernet and Wi-Fi. An audio interface 694 comprises one or more microphones and speakers for capture and playback of digital audio data. A display controller 695 and a button interface 696 are also provided to interface the controller 622 to the physical display 623 and controls 624, 625, 626 present on the camera body. The foregoing components of the controller 622, the image sensor 691, and the lens controller 698 are interconnected by a data bus 681 and a control bus 682.

In a capture mode, the controller 622 operates to read data from the image sensor 691 and the audio interface 694 and manipulates that data to form a digital representation of the scene that can be stored to the non-volatile mass data storage 692. In the case of a still image camera, image data may be stored using a standard image file format such as JPEG or TIFF, or the image data may be encoded using a proprietary raw data format that is designed for use with a complimentary software product that provides conversion of the raw format data into a standard image file format. Such software is typically run on a general-purpose computer. For a video camera, the sequences of images that comprise captured video are stored using a standard format such DV, MPEG, H.264. Some of these formats such as AVI or Quicktime® are organised into files referred to as container files. Other formats such as DV, which are commonly used with tape storage, are written as a data stream. The non-volatile mass data storage 692 is used to store the image or video data captured by the camera system 600 and has a large number of realisations including but not limited to removable flash memory such as a compact flash (CF) or secure digital (SD) card, memory stick, multimedia card, miniSD or microSD card, optical storage media such as writable CD, DVD or Blu-Ray™ disk, or magnetic media such as magnetic tape or hard disk drive (HDD) including very small form-factor HDDs such as microdrives. The choice of mass storage depends on the capacity, speed, usability, power and physical size requirements of the particular camera system.

In a playback or preview mode, the controller 622 operates to read data from the mass storage 692 and presents that data using the display 695 and audio interface 694.

The processor 650 can execute programs stored in one or both of the connected memories 660 and 670. When the camera system 600 is initially powered up system program code 661, resident in ROM memory 660, is executed. This system program permanently stored in the camera system's ROM 660 is sometimes referred to as firmware. Execution of the firmware by the processor 650 fulfils various high-level functions, including processor management, memory management, device management, storage management and user interface.

The processor 650 includes a number of functional modules including a control unit (CU) 651, an arithmetic logic unit (ALU) 652, a digital signal processing engine (DSP) 653 and a local or internal memory comprising a set of registers 654 which typically contain atomic data elements 656, 657, along with internal buffer or cache memory 655. One or more internal buses 659 interconnect these functional modules. The processor 650 typically also has one or more interfaces 658 for communicating with external devices via the system data 681 and control 682 buses using a connection 655.

The system program 661 includes a sequence of instructions 662 though 663 that may include conditional branch and loop instructions. The program 661 may also include data which is used in execution of the program. This data may be stored as part of the instruction or in a separate location 664 within the ROM 660 or in RAM 670.

In general, the processor 650 is given a set of instructions, which are executed therein. This set of instructions may be organised into blocks that perform specific tasks or handle specific events that occur in the camera system. Typically the system program 661 waits for events and subsequently executes the block of code associated with that event. This may involve setting into operation separate threads of execution running on independent processors in the camera system such as the lens controller 698 that subsequently executes in parallel with the program running on the processor 650. Events may be triggered in response to input from a user as detected by the button interface 696. Events may also be triggered in response to other sensors and interfaces in the camera system.

The execution of a set of the instructions may require numeric variables to be read and modified. Such numeric variables are stored in RAM 670. The disclosed method uses input variables 671, that are stored in known locations 672, 673 in the memory 670. The input variables are processed to produce output variables 677, that are stored in known locations 678, 679 in the memory 670. Intermediate variables 674 may be stored in additional memory locations in locations 675, 676 of the memory 670. Alternatively, some intermediate variables may only exist in the registers 654 of the processor 650.

The execution of a sequence of instructions is achieved in the processor 650 by repeated application of a fetch-execute cycle. The control unit 651 of the processor 650 maintains a register called the program counter which contains the address in memory 660 of the next instruction to be executed. At the start of the fetch execute cycle, the contents of the memory address indexed by the program counter is loaded into the control unit. The instruction thus loaded controls the subsequent operation of the processor 650, causing for example, data to be loaded from memory into processor registers 654, the contents of a register to be arithmetically combined with the contents of another register, the contents of a register to be written to the location stored in another register and so on. At the end of the fetch execute cycle the program counter is updated to point to the next instruction in the program. Depending on the instruction just executed this may involve incrementing the address contained in the program counter or loading the program counter with a new address in order to achieve a branch operation.

Each step or sub-process in the processes of flow charts are associated with one or more segments of the program 661 and is performed by repeated execution of a fetch-execute cycle in the processor 650 or similar programmatic operation of other independent processor blocks in the camera system.

The process of determining whether a location is regarded as personal by a user when capturing a photo is now described in detail hereinafter. This process involves analysing previously captured photos to identify a pattern exhibited by the user when capturing photos at each location. The frequency and regularity of the pattern is used to assess the personal nature of a location.

[Processing Images Having Related Geolocations]

Figure 1:
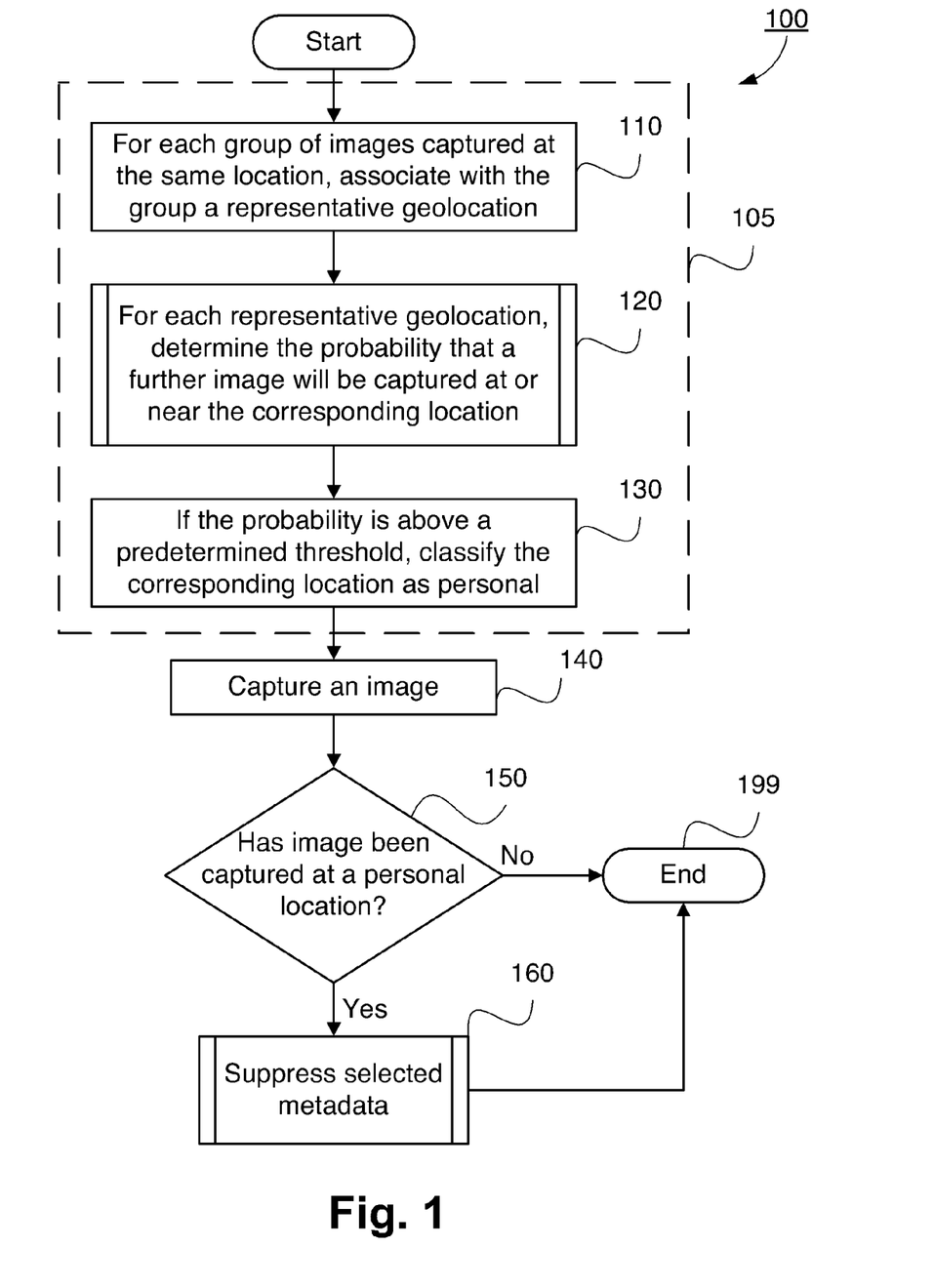
FIG. 1 is a schematic flow diagram illustrating a method of processing captured images having geolocations related to the captured images at the time of capture according to an embodiment of the invention, the processed images can be used to selectively suppressing at least one metadata value of an image captured by an image capturing apparatus.

The method 100 of FIG. 1 processes captured images having geolocations related to the captured images at the time of capture according to an embodiment of the invention. This processing of captured images is denoted by a dashed box 105 comprising three steps 110, 120, 130. The result of the processed images can be used to selectively suppress at least one metadata value of an image captured by an image capturing apparatus using steps 140, 150, and 160 of the method 100. Images (e.g., photos) captured at locations can be identified that may be considered as personal to a user and selected metadata values of the identified images, which the user may be sensitive about disseminating, can be suppressed. For example, metadata such as geotags and name tags of people may be suppressed. However, other types of metadata may be suppressed. The method 100 starts at step 110.

In step 110, a representative geolocation is associated with each group of images captured at the same location. This step involves analysing metadata of previously captured images, including their geotags. In one embodiment, the previously captured images and metadata are stored together. Groups of images are identified such that the images within a group have all been captured within close proximity of each other at a particular location, e.g. at home, a park, etc. For example, an extension of the Quality Threshold (QT) clustering algorithm may be used to determine the groups, by:

(i) choosing a maximum diameter for the clusters to be formed, typically 100 meters;

(ii) building a candidate cluster for each image such that with the geolocation of the image as the centre of the cluster, all images in the candidate cluster are within the specified maximum diameter;

(iii) saving the candidate cluster with the most number of images as a final cluster and removing the images for further consideration;

(iv) recursively finding the next cluster with the most number of images from the remaining images until all of the images are in a final cluster.

As an extension, if two or more final clusters are separated by a distance less than the specified maximum diameter, they are combined into a single cluster. Each of the final clusters represents a group of images captured within close proximity of each other at a particular location.

For each of the groups of images identified, a representative geolocation derived from the geotags of the images within the group is associated with the group. The representative geolocation may be selected from the geotags of the images in the group such that the representative geolocation is the overall nearest neighbour to the remaining images, that is, the sum of the distances from the remaining images of the group is the shortest. In other circumstances, the representative geolocation may be calculated from the geolocations of at least some of the images within the group.

At step 120, for each group, the probability that a further image will be captured at or near the corresponding representative geolocation is determined. This step is described hereinafter with reference to FIG. 2.

In step 130, if the probability determined in step 120 is above a predetermined threshold, the corresponding location is classified as personal. The respective representative geolocation is associated with a personal place. The processing of captured images having geolocations related to the captured images at the time of capture is completed at the end of step 130. The remaining steps of FIG. 1 can be practiced in accordance with a further embodiment of the invention to suppress selected metadata of a captured image dependent upon the processing 105 carried out in steps 110, 120, 130.

In step 140, an image is captured using an image capturing apparatus. The main controller 622 can control capture of an image as a result of the user operating the camera 600 to capture the image.

In decision step 150, a check is made to determine if the image has been captured at a personal location. This involves determining if the geolocation of the captured image is considered as personal by looking up a representative geolocation classified as personal in step 130 that is within close proximity to the current geolocation. If step 150 determines that the current geolocation is not personal (NO), the process 100 ends at step 199 without suppression of metadata. However, if step 150 determines that one is found (YES) indicating the current geolocation is considered as personal, processing continues at step 160. In step 160, selected metadata that a user may consider to be sensitive (i.e. personal or private) is suppressed in respect of the captured image. The immediate suppression of selected metadata, such as geotag, date and face tags of recognised faces, straight after capturing provides the benefit that images may be safely disseminated without disseminating sensitive metadata of a personal or private nature. A number of metadata suppression embodiments that can be practice in step 160 are described hereinafter. Processing then ends at step 199.

The foregoing embodiments of the invention are described as a single linear process 100 with minimal branching for simplicity and a complete understanding. After gaining an understanding of the method 100, it should become apparent that the personal location analysis stage 105, including steps 110 to 130, and the image capturing stage, comprising steps 140 to 160, are two distinct stages and may be performed separately with minimal dependence. For efficiency, the personal location analysis stage 105 may be processed in advance of the image capturing stage to avoid any delays in starting the latter. Having processed the personal location analysis stage 105 at least once, the image capturing stage may be processed repeatedly to capture multiple images without further processing the personal location analysis stage. In addition, newly captured images may be added to the original image collection for further personal location analysis on an incremental basis using the saved results from the previous analysis. The benefit of including the latest images in the personal location analysis is that the classification of personal locations is able to adapt to the current image-capturing pattern of the user and modify the classification as necessary. That is, if photos are being taken more regularly at a particular location as a result of more regular visits by a user, the classification of the location may change from non-personal to personal or vice versa.

Once the captured images have been analysed in the personal location analysis stage 105, the images are no longer required when performing further analysis on newly captured images if the data of the captured images used for the analysis, e.g. timestamps, and the results of the analysis are saved, e.g. in persistent memory 664. The data can be retrieved for further personal location analysis without the original images. This allows the captured images to be downloaded from the camera system 600 to relinquish space on the mass storage 692 for storing further images.

The main controller 622 can implement step 110 and the previously captured images and metadata can be stored in the camera 600, e.g. in the mass storage 692. In step 130, the main controller 622 may perform the classifying of whether a representative geolocation is considered as personal to the user according to the thresholds for the user, and the thresholds may be stored in persistent memory 664. In step 150, the controller 622 can determine if the location of the captured image obtained by an auxiliary sensor 697, such as a GPS receiver, is considered as personal by looking up a representative geolocation classified as personal in step 130 that is within close proximity to the current geolocation. Step 160 may be performed in the camera system 600. The immediate suppression of selected metadata, such as geotag, date and face tags of recognised faces, straight after capturing provides the benefit that images may be safely uploaded to the Internet for instant sharing via the communication interface 693. Steps 110, 120, 130 may be performed in the camera 600, or in a general-purpose computer separate from the camera. For example, steps 110, 120, 130 may be performed on a general-purpose camera, but the remaining steps 140, 150, 160 may be performed on the camera using the results of steps 110, 120, 130. However, steps 110-130, 150, and 160 may be performed on the camera or the general-purpose computer.

[Determining Probability about Further Image]

Figure 2:
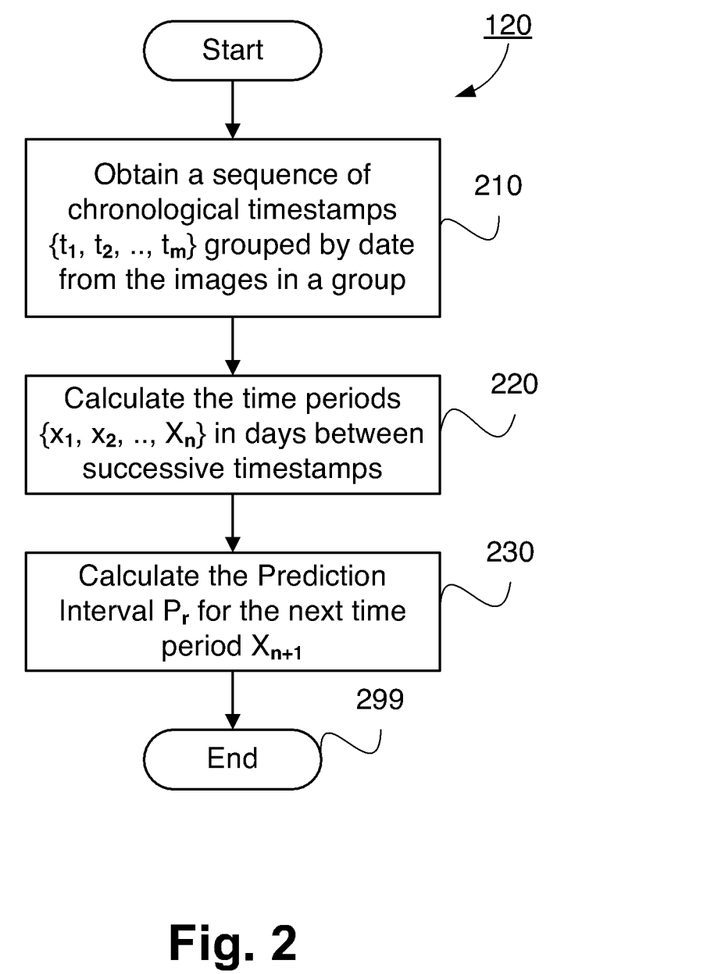
FIG. 2 is a schematic flow diagram illustrating a method of calculating the probability of when a further image will be captured at a particular location, as used in the method of FIG. 1.

FIG. 2 shows in detail the step 120 of FIG. 1 performed for each group of images. At step 210, a sequence of chronological timestamps $\{t_1, t_2, \ldots, t_m\}$ grouped by date is obtained from the images in a group, i.e. from the metadata of the images. In the sequence of chronological timestamps $\{t_1, t_2, \ldots, t_m\}$, $t_i$ is the date when an image was captured, e.g. $\{18/7/2009, 25/7/2009, 2/8/2009, 8/8/2009, 15/8/2009, 29/9/2009\}$. In step 220, the time duration in days $\{x_1, x_2, \ldots, x_n\}$ is calculated between the obtained successive timestamps, where $n=m-1$ and $x_i$ is the time duration between $t_i$ and $t_{i+1}$, e.g. $\{7, 8, 6, 7, 14\}$. In step 230, the prediction interval $P_r$ is calculated for the next time duration $x_{n+1}$ according to:

$$Pr(\bar{x}_n - T_a s_n \sqrt{1 + (1/n)} \leq x_{n+1} \leq \bar{x}_n + T_a s_n \sqrt{1 + (1/n)}) = p,$$

where $$\bar{x} = \bar{x}_n = (x_1 + x_2 + \ldots + x_n)/n$$

$$s^2 = s_n^2 = \frac{1}{n-1} \sum_{i=1}^{n} (x_i - \bar{x}_n)^2$$

$T_a$ is the $$100\left(\frac{1+p}{2}\right)th$$

percentile of the t-distribution with n−1 degrees of freedom. Using the above example, $$\bar{x}_n = (7 + 8 + 6 + 7 + 14)/5 = 8.4$$

$$s_n = \sqrt{\frac{1}{5-1}[(7-8.4)^2 + (8-8.4)^2 + (6-8.4)^2 + (7-8.4)^2 + (14-8.4)^2]} =$$

3.209

For (5−1)=4 degrees of freedom and p=90%, i.e. a prediction interval of $$100\left(\frac{1+0.9}{2}\right) = 95\% \text{ percentile}, T_a = 2.132$$

$$Pr\left(\bar{x}_n - T_a s_n \sqrt{1+(1/n)} \leq x_{n+1} \leq \bar{x}_n + T_a s_n \sqrt{1+(1/n)}\right) = p$$

$$Pr\left(8.4 - (2.132)(3.209)\sqrt{1+(1/5)} \leq\right.$$
$$\left. x_{n+1} \leq 8.4 + (2.132)(3.209)\sqrt{1+(1/5)}\right) = 90\%$$

$$Pr(0.905 \leq x_{n+1} \leq 15.90)$$

In this example, there is a 90% chance that the user will return to the location and capture another image approximately between one and 16 days after the last image was captured on the 29/9/2009. Depending on the timing of the prediction interval relative to the current time and the duration window of the prediction interval, the user may consider the location as personal if there is a significantly high probability of association between the user, the location and a window of time in the future.

The controller 622 can perform steps 210, 220, and 230.

Figure 5A:
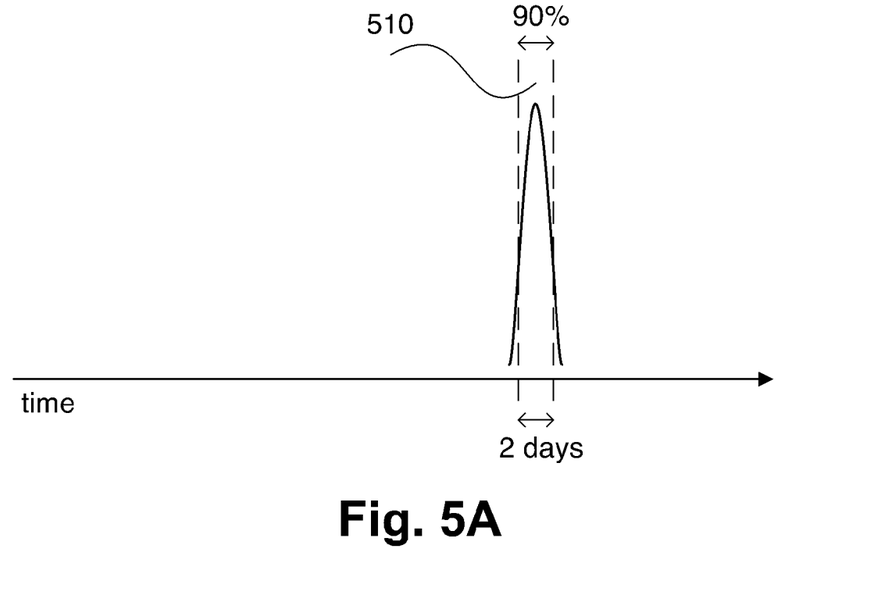
FIG. 5A and FIG. 5B are plots illustrating examples of prediction intervals as calculated using the method of FIG. 2.

FIG. 5A illustrates the scenario of a highly predictable image capturing pattern, e.g. weekly netball matches at a local sports ground participated by the child of a user. The prediction interval 510 indicates a 90% chance that the user is associated with a particular location within a 2-day window. This suggests that there is a privacy concern to the user if the prediction interval is still in the future, but this concern diminishes as more time passes beyond the prediction interval. In this case, the user may be prompted to confirm whether the location of concern is in fact personal or not.

Figure 5B:
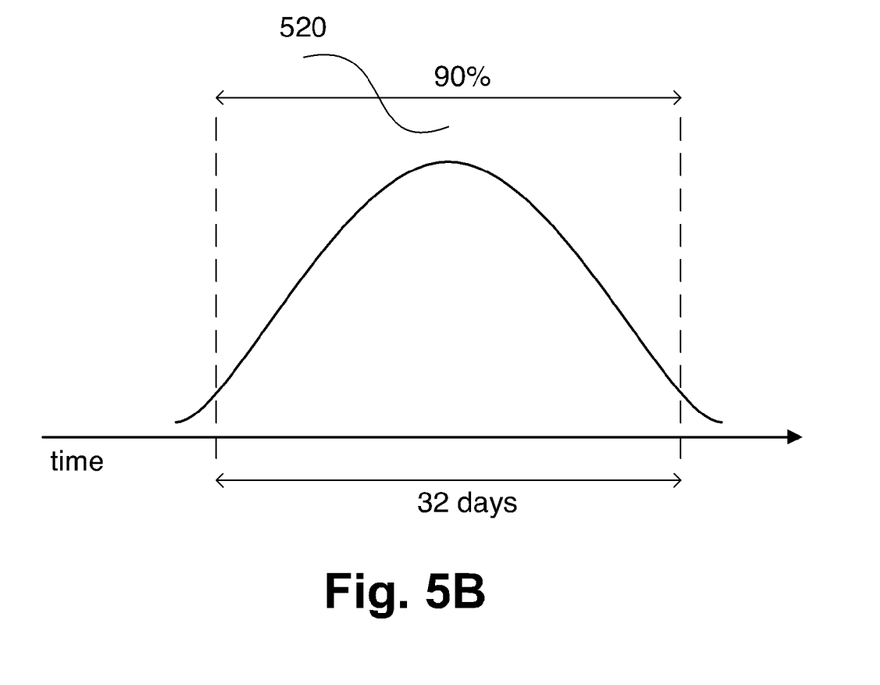

In contrast, FIG. 5B shows the scenario of an irregular image capturing pattern. The prediction interval 520 indicates a 90% chance that the user is associated with a particular location within a 32-day window. Even if the prediction interval is still in the future, some users may be comfortable to disregard the location as personal due to the inaccuracy of such a wide window. As privacy is to an extent a perception of the user, the prediction interval percentile and the duration window thresholds can be configured to match the comfort zone of the user.

[Suppressing Metadata]

Figure 3:
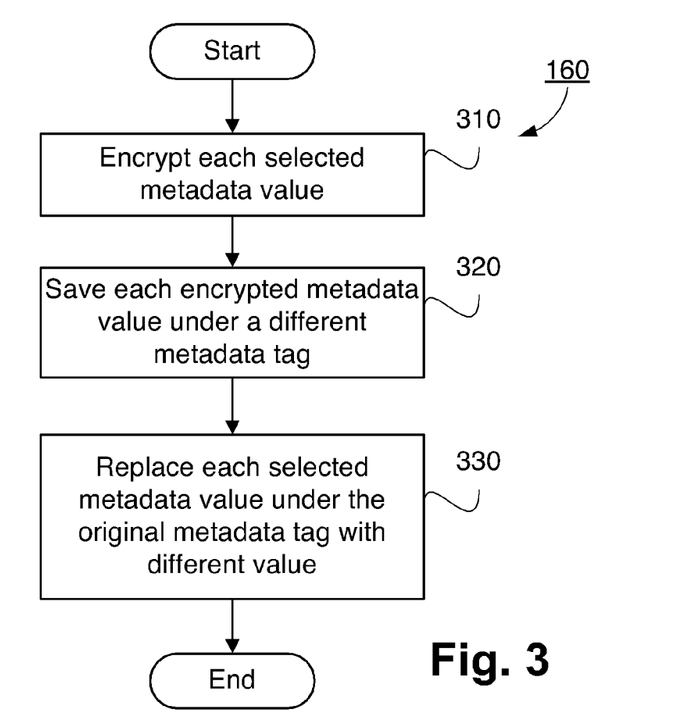
FIG. 3 is a schematic flow diagram illustrating a method of suppressing metadata as used in the method of FIG. 1 according to a further embodiment of the invention.

After identifying the images of concern, sensitive metadata values such as geotag, timestamp, keywords, etc. needs to be suppressed before sharing the images publicly. The embodiments of the step 160 for suppressing selected sensitive metadata values are described hereinafter. FIG. 3 shows in detail the step 160 of FIG. 1 for suppressing selected metadata values by encryption. In step 310, the selected metadata values are encrypted. This may include the sensitive metadata regarding privacy. In step 320, the encrypted metadata values are saved under different tags in the metadata. Preferably, the user with access to the encryption key can retrieve the original metadata values transparently. In step 330, the selected metadata values under the original metadata tag are replaced by different values to mitigate any privacy concern. Some examples of this range from assigning a blank value, introducing a deliberate error to the value, or reducing the resolution of the value, e.g. disclosing a location at a city level, disclosing a timestamp to the nearest year, etc. Processing then ends.

Figure 4:
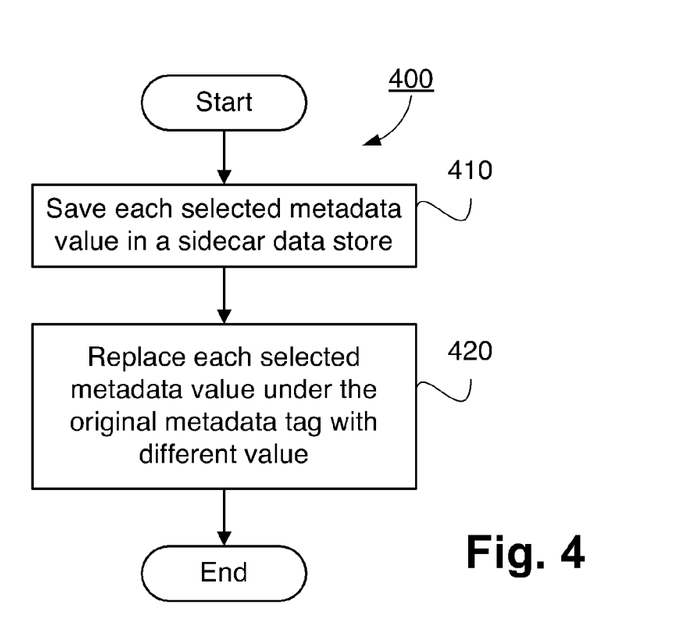
FIG. 4 is a schematic flow diagram illustrating a method of suppressing metadata as used in the method of FIG. 1 according to a still further embodiment of the invention.

FIG. 4 shows in detail an alternative implementation of step 160 for suppressing selected sensitive metadata values by storing the original metadata values in a separate data store. In step 410, selected metadata values are stored in an external sidecar data store that is not publicly shared. Preferably, the storage organisation allows the user transparent access to the original metadata values using a unique reference of the corresponding image. In step 420, the selected metadata values under the original metadata tag are replaced by a different value, as in step 330. Processing then ends.

Also, the processes of FIGS. 3 and 4 may be combined so that selected metadata is encrypted, removed from the original metadata tag, replaced with a different value, and the encrypted metadata value is stored externally as in step 410 of FIG. 4.

The processing 105 carried out in steps 110, 120 and 130 is based on the use of probability techniques. This particular embodiment has an adaptive characteristic such that a change in the user's image capturing pattern over a period of time may alter the result, e.g. a location determined as personal previously may no longer be personal if no images have been captured at the location for long period of time. It will be apparent to those skilled in the art that other processing embodiments based on analysing the pattern of the image timestamps may be used to provide other desirable characteristics.

Figure 7:
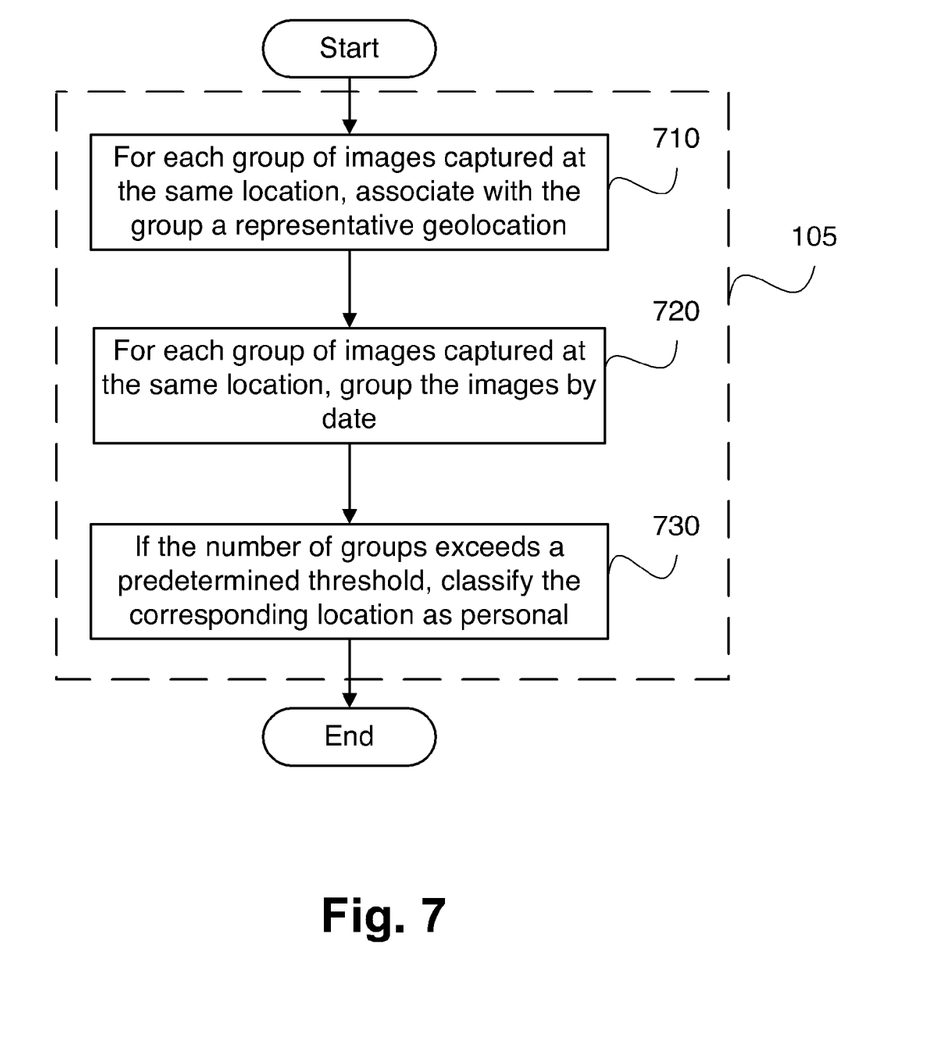
FIG. 7 is a flow diagram illustrating a method of processing of captured images having geolocations in accordance with an alternative embodiment of the invention.

One such alternative embodiment to perform the processing 105 is described hereinafter with reference to FIG. 7. In step 710, a representative geolocation is associated with each group of images captured at the same location as in step 110 of FIG. 1. In step 720, the images associated with the same representative geolocation are grouped by date based on the timestamp of the images. This number typically indicates the number of visits or times present at the location. In step 730, the corresponding location (representative geolocation) is classified as personal if the number of visits is above a predetermined threshold. That is, if images have been captured at the same geolocation on multiple and different occasions, the geolocation is deemed personal. This embodiment provides a different characteristic as that of steps 110, 120 and 130, such that the determination is static rather than adaptive. That is, if a geolocation is determined as personal, the result is not affected by future changes in the user's image capturing pattern.

Yet another alternative embodiment may involve the use of a machine learning technique to perform supervised learning of timestamp patterns of images captured by different users at known personal locations. A classifier trained by the learning can then be used to classify whether a representative geolocation of another user's images is personal.

Another aspect of the invention is to address the suppression of sensitive metadata of all images captured at strictly private locations such as private residences, schools, etc. more definitively. Although possible, the classification of these definitively private locations does not require the same personal location analysis, and the classification does not require to be changed in the same manner as personal locations by adapting to the image-capturing pattern of the user. Therefore, in addition to the process 100, the representative geolocation of private places may be entered by the user explicitly instead of determined by the personal location analysis steps 110 to 130. The user can specifying a geolocation as a personal location. This step is different to the steps of the methods 105 and 100 of FIG. 1 and does not result from those steps. The means for entering private representative geolocations to augment the personal representative geolocations include but not limited to the following: inputting textual addresses, importing addresses from an existing contact list, manually entering or setting the current geolocation as a private representative geolocation.

Another aspect of the invention is concerned with using the process 100 without the immediate suppression of metadata 160. Instead, when a determination is made that an image was captured at a personal location 150, the image is flagged for further processing by another system outside the image capture system 600. This may be achieved by creating and setting such flag in the metadata of the captured image or by passing the flag as additional data along with the images to another system.

Yet another aspect of the invention is concerned with using the process 100 of FIG. 1, in particular steps 110 to 130, in an image management system, such as a photo management application, to identify a subset of images captured at personal locations in order to allow the system to mitigate any privacy risks when sharing the images publicly.

INDUSTRIAL APPLICABILITY

The arrangements described are applicable to the computer and data processing industries and particularly for the processing digital images.

Methods, apparatuses, and computer readable storage mediums for processing captured images having geolocations related to the captured images at the time of capture have been described. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of processing captured images having geolocations related to the captured images at the time of capture, said method comprising the steps of:
    associating a representative geolocation with a group of images previously captured at or near the same location; and
    for the representative geolocation, determining, based on timestamps associated with the capture of the images, whether the representative geolocation is a predetermined place where at least one further image is predicted to be captured within a time interval associated with the predetermined place.

2. The method as claimed in claim 1, wherein the predetermined place is a personal place.

3. A method of processing captured images having geolocations related to the captured images at the time of capture, said method comprising the steps of:
    associating a representative geolocation with each group of images previously captured at the same location;
    for each representative geolocation, determining, based on at least timestamps of the images associated with the representative geolocation, a probability that a further image will be captured at or near the representative geolocation within a time interval; and
    for representative geolocations with a determined probability above a predetermined threshold and based on said time interval, associating the representative geolocations with at least one predetermined place.

4. The method as claimed in claim 3, further comprising the step of capturing an image having a geolocation related to the captured image at the time of capture.

5. The method as claimed in claim 3 or 4, further comprising the step of suppressing at least one metadata value of a captured image when the geolocation related to the captured image is at or near at least one predetermined place.

6. The method as claimed in claim 5, wherein the at least one metadata value is suppressed by at least one of storing the metadata value in an external data store separately from the captured image and encrypting the metadata value.

7. The method as claimed in claim 5, wherein the at least one metadata value is suppressed by replacing the metadata value with a different value.

8. The method as claimed in claim 7, wherein the different value is a blank value or a value reducing resolution of the metadata value.

9. The method as claimed in claim 4, wherein the captured image is captured using an image capturing apparatus adapted to acquire a geolocation related to the captured image at the time of image capture.

10. The method as claimed in claim 4, further comprising the step of suppressing at least one metadata value of a captured image when the geolocation related to the captured image is at or near at least one personal place.

11. The method as claimed in claim 3, further comprising the step of specifying the representative geolocation as a personal location.

12. The method as claimed in claim 11, wherein specifying the representative geolocation as a personal location comprises inputting textual addresses, or importing addresses from a contact list, or manually entering the representative geolocation.

13. The method as claimed in claim 3, wherein the geolocations and at least the timestamps of the images are stored for further processing, the images being downloaded separately.

14. The method as claimed in claim 3, wherein the predetermined place is a personal place.

15. An apparatus for processing captured images having geolocations related to the captured images at the time of capture, said apparatus comprising:
    at least one processor and memory, cooperating to function as:
    a first association unit which associates a representative geolocation with each group of images previously captured at the same location;
    a determination unit which, for each representative geolocation, determines, based on at least timestamps of the images associated with the representative geolocation, a probability that a further image will be captured at or near the representative geolocation within a time interval; and
    a second association unit which, for representative geolocations with a determined probability above a predetermined threshold and based on said time interval, associates the representative geolocations with at least one predetermined place.

16. The apparatus as claimed in claim 15, further comprising a suppression unit which suppresses at least one metadata value of a captured image when the geolocation related to the captured image is at or near at least one predetermined place.

17. The apparatus as claimed in claim 16, wherein the at least one metadata value is suppressed by at least one of storing the metadata value in an external data store separately from the captured image and encrypting the metadata value.

18. The apparatus as claimed in claim 16, wherein the at least one metadata value is suppressed by replacing the metadata value with a different value.

19. The apparatus as claimed in claim 18, wherein the different value is a blank value or a value reducing resolution of the metadata value.

20. The apparatus as claimed in claim 15, further comprising an image capturing apparatus adapted to acquire a geolocation related to a captured image at the time of image capture.

21. The apparatus as claimed in claim 15, wherein the geolocations and at least the timestamps of the images are stored in a memory of said image capturing apparatus for further processing, allowing the images to be downloaded from said image capturing apparatus and removed from the memory.

22. The apparatus as claimed in claim 15, wherein the predetermined place is a personal place.

23. A non-transitory computer-readable storage medium having recorded therein a computer program for causing a computer to execute a method, said method comprising the steps of:
   associating a representative geolocation with each group of images previously captured at the same location; for each representative geolocation, determining, based on at least timestamps of the images associated with the representative geolocation, a probability that a further image will be captured at or near the representative geolocation within a time interval; and
   for representative geolocations with a determined probability above a predetermined threshold and based on said time interval, associating the representative geolocations with at least one predetermined place.

24. The storage medium as claimed in claim 23, said method further comprising a step of suppressing at least one metadata value of a captured image when the geolocation related to the captured image is at or near at least one predetermined place.

25. The storage medium as claimed in claim 23, wherein the at least one metadata value is suppressed by at least one of storing the metadata value in an external data store separately from the captured image and encrypting the metadata value.

26. The storage medium as claimed in claim 23, wherein the images are captured using an image capturing apparatus adapted to acquire a geolocation related to a captured image at the time of image capture.

27. The storage medium as claimed in claim 23, wherein the geolocations and at least the timestamps of the images are stored for further processing, allowing the images to be downloaded.

* * * * *